United States Patent [19]

Murakami

[11] 3,935,793
[45] Feb. 3, 1976

[54] HYDRAULIC PRESSURE REGULATING SYSTEM
[75] Inventor: Noboru Murakami, Nagoya, Japan
[73] Assignee: Aisin Seiki Kabushiki Kaisha, Toyota, Japan
[22] Filed: Apr. 10, 1974
[21] Appl. No.: 459,583

Related U.S. Application Data
[63] Continuation of Ser. No. 280,217, Aug. 14, 1972.

[52] U.S. Cl. ............... 91/446; 91/448; 192/109 F
[51] Int. Cl.² .................. F15B 11/08; F15B 13/042
[58] Field of Search ....... 91/38, 446, 448, 468, 433; 192/109 F, 85; 137/505.13, 505.14

[56] References Cited
UNITED STATES PATENTS

| | | | |
|---|---|---|---|
| 1,204,759 | 11/1916 | Gray | 91/38 X |
| 2,809,536 | 10/1957 | O'Malley | 192/109 F |
| 3,223,000 | 12/1965 | Payne et al. | 91/446 X |
| 3,583,422 | 6/1971 | Dach et al. | 192/109 F |
| 3,656,600 | 4/1972 | Kitand et al. | 192/109 F |
| 3,674,121 | 7/1972 | Copeland | 91/468 X |

FOREIGN PATENTS OR APPLICATIONS
1,050,656  9/1953  France ............... 192/109 F Primary Examiner—Irwin C. Cohen
Attorney, Agent, or Firm—Oblon, Fisher, Spivak, McClelland & Maier

[57] ABSTRACT

A hydraulic pressure regulating system for a vehicle having a regulator valve, a shift valve and a plurality of fluid actuated clutch means, wherein an accumulator being provided between the regulator valve and the shift valve is so designed as to control the fluid pressure to keep it relatively low when the fluid actuated clutch means is in its initial engagement condition and communicates with the regulator valve so as to increase the fluid pressure sufficiently to provide for the full engagement of the fluid actuated clutch means when the clutch means becomes substantially fully engaged.

2 Claims, 1 Drawing Figure

U.S. Patent  February 3, 1976  3,935,793
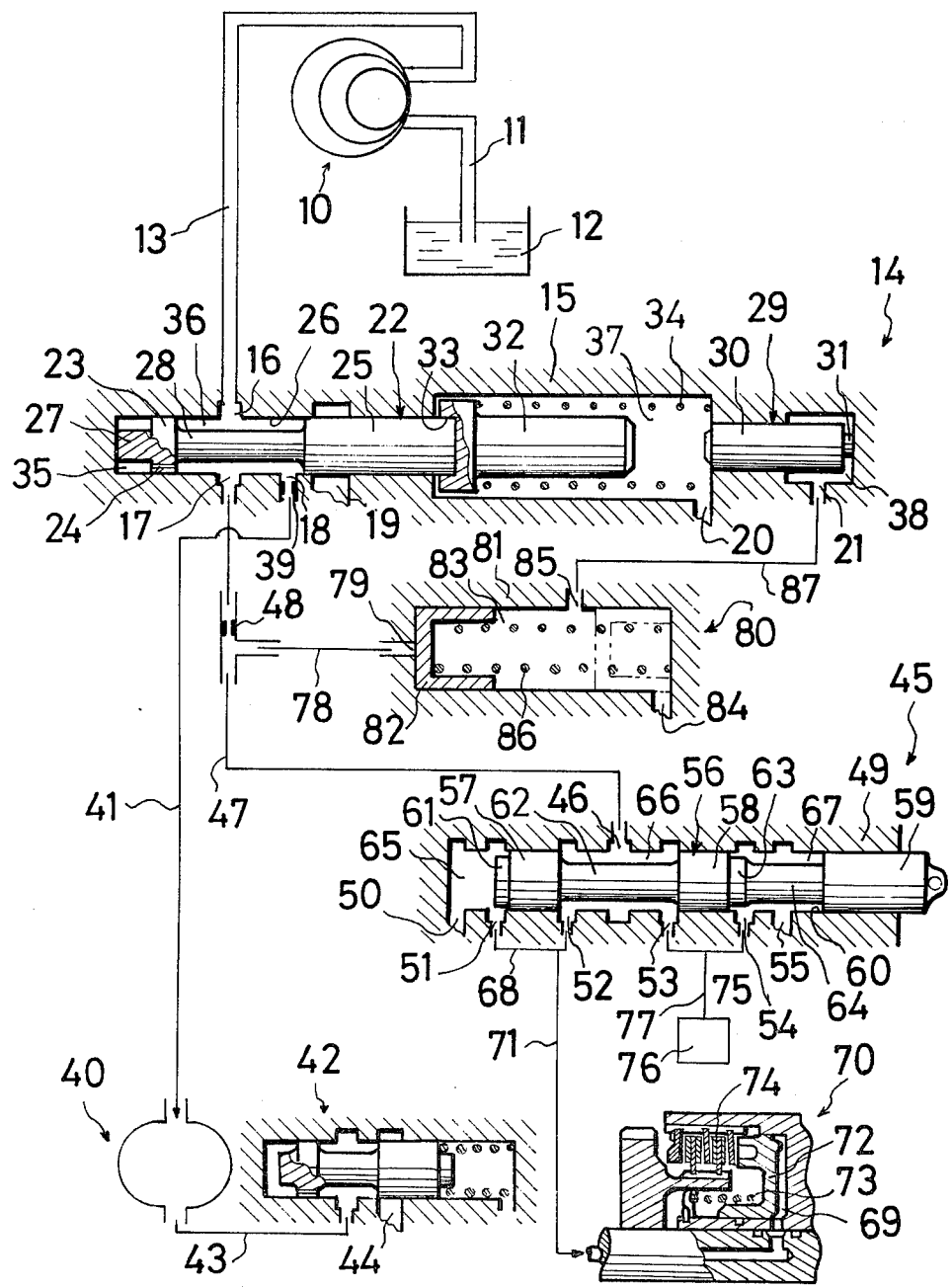

3,935,793

HYDRAULIC PRESSURE REGULATING SYSTEM

This is a continuation, of application Ser. No. 280,217 filed Aug. 14, 1972.

BACKGROUND OF THE INVENTION

This invention relates generally to improvements in a hydraulic pressure regulating system, and more particularly to a device for regulating a hydraulic pressure in a transmission control system for such a vehicle of the type being provided with a fluid actuated frictionally engaging means, such as a clutch or brake means.

It is required in the operation of a vehicle that the frictional engagement of a clutch or brake device be smooth with as small of an impact as possible. Upon a conventional transmission being fluidically shifted to a forward or a rearward drive position, such shifting often results in the frictionally engaging means being abruptly engaged thereby to bring about a great impact and, in consequence, not only to give a feeling of discomfort to the occupants of the vehicle but to cause damages to various parts thereof.

To obviate this deficiency, there has been introduced in such vehicles a fluid pressure control means such as an orifice and an accumulator or modulator valve in a conduit between a regulator valve regulating the pressure of the fluid discharged from an oil pump to be sufficient for fluid actuated means, such as a clutch means, in a maximumly loaded driving condition of the vehicle and such fluid actuated means. According to the conventional method above-mentioned, however, the fluid under pressure regulated by the regulator valve is rather high in comparison with the fluid pressure needed for the full engagement of the fluid actuated means during an ordinary running condition, so that there still remains an impact in the engaging operation of such fluid actuated means. Otherwise the fluid pressure control valve will be much more complex in construction, bigger in size and more expensive in manufacturing cost. These deficiencies are considered to be greatly disadvantageous in practice.

SUMMARY OF THE INVENTION

It is, therefore, an object of the present invention to provide an improved hydraulic pressure regulating system adapted for obviating the aforementioned drawbacks of conventional regulating systems, with the provision of an accumulator in the present system for controlling the fluid pressure to keep it relatively low when a fluid actuated means is in its initial engagement condition and for finishing its own operation so as to increase the fluid pressure to be sufficient for full engagement of the fluid actuated means when the fluid actuated means is to be substantially fully engaged.

It is another object of the present invention to provide an improved hydraulic regulating system capable of obviating the power loss of the driving power used by an oil pump.

It is still another object of the present invention to provide an improved hydraulic regulating system which is simple in construction, small in size and cheap in manufacturing cost.

BRIEF DESCRIPTION OF THE DRAWINGS

Various other objects, features and attendant advantages of the present invention will be more fully appreciated as the same becomes better understood from the following detailed description when considered in connection with the accompanying drawings, in which:

The sole FIGURE is a diagramatic view of one embodiment of a fluid pressure control system constructed according to the present invention.

DETAILED DESCRIPTION OF A PREFERRED EMBODIMENT

Referring now to the drawing, the numeral 10 generally designates an oil pump for pumping up fluid from a reservoir 12 through a conduit 11 into a conduit 13. A regulator valve assembly generally designated by reference numeral 14 comprises a valve housing 15 having radial openings 16, 17, 18, 19, 20 and 21, a spool valve generally designated by reference numeral 22 having lands 23 with an orfice 24 therethrough and 25 both being axially slidably fitted within a differential bore 26 of the valve housing 15 and smaller diameter lands 27 and 28 being radially spaced from the wall defining the differential bore 26, a plug 29 having a larger diameter land 30 substantially half of which being axially slidably fitted within the bore 26 and a smaller diameter land 31 being radially spaced from the bore 26, a seat 32 receiving the spool valve 22 in a left side recess 33 thereof and transmitting a biasing force of a coil spring 34 to the spool valve 22 and valve chambers 35, 36, 37 and 38. The opening 16 of the valve housing is connected to the conduit 13, and the opening 18 is provided with an orifice 39 and connected to a torque converter 40 through a conduit 41, while openings 19 and 20 lead to drain pipes, not shown. The torque converter 40 is connected to an outlet pressure control valve 42 thereof through a conduit 43. An opening 44 of the outlet pressure control valve 42 leads to a drain pipe, not shown. The torque converter 40 is of conventional construction and need not be further described. Opening 17 of the valve housing 15 is connected to an opening 46 of a shift valve unit generally designated by reference numeral 45 through a conduit 47 being provided with a restriction orifice 48 in the path thereof.

The shift valve unit 45 comprises a valve housing 49 provided with radial openings 46, 50, 51, 52, 53, 54 and 55, a spool valve 56 having lands 57, 58 and 59 being axially slidably fitted within a bore 60 of the valve housing 49 and smaller diameter lands 61, 62, 63 and 64 being spaced radially inward from the housing wall defining the bore 60 and valve chambers 65, 66 and 67. Openings 50 and 55 are connected to drain pipes, not shown. Openings 51 and 52 are connected to each other through a conduit 68 and are further connected to a chamber 69 of a forward drive clutch 70 through a conduit 71 thereby actuating a piston 72 to move against a return spring 73 and to press clutch discs 74 into engagement upon fluid under pressure being supplied into the chamber 69. The openings 53 and 54 of the valve housing 49 are connected to each other through a conduit 75 and are further connected to a rear drive clutch 76 constituted in the same manner as the forward drive clutch 70 through a conduit 77. The conduit 47 branches off from a conduit 78 between the orifice 48 and the opening 46 of the shift valve unit 45. The conduit 78 communicates with an accumulator generally designated by reference numeral 80 through an opening 79 of a cylinder housing 81 having a piston 82 being axially slidably fitted therewithin, a piston chamber 83, radial openings 84 and 85 and a coil spring 86 biasing the piston 82 leftwardly on the drawing. The opening 84 leads to a drain pipe, not shown, and the opening 85 is connected to the opening 21 of the valve chamber 38 of the pressure regulator valve assembly 14 through a conduit 87.

In the operation of the present device, when the spool valve 56 of the shift valve unit 45 is placed in a neutral position as shown in the drawing, the fluid discharged from the reservoir 12 for actuating the forward and rear drive clutches 70 and 76 is circulated back to the reservoir 12 through conduits 13, 47, 68 and 75. Although the orifice 48 causes the fluid in conduits and chambers leading thereto from the pump 10 to pressurize, this fluid under pressure being introduced into valve chamber 35 through the orifice 24 does not have enough force to urge the spool valve 22 to move against the biasing force of the coil spring 34, with the result being that the opening 19 is still closed by thee land 25 of the spool valve 22. Therefore, fluid under pressure is supplied to the torque converter 40 through the opening 18, the orifice 39 of which is larger in diameter than the orifice 48 and the conduit 41.

When it is required to drive the vehicle in the forward direction, the spool valve 56 of the shift valve unit 45 is moved axially leftwardly and placed into the forward drive position, whereupon the lands 57 and 58 of the spool valve 56 close the openings 51 and 53 to thereby supply fluid under pressure to the forward drive clutch 70 and pressurize the fluid in the respective conduits and chambers. Consequently, the fluid under pressure introduced into the valve chamber 35 through the orifice 24 is further pressurized and becomes able to move the spool valve 22 rightwardly overcoming the biasing force of the coil spring 34 and regulate the fluid pressure in response to the biasing force of the coil spring 34 at the point where the smaller diameter land 28 comes to open the opening 19 which leads to the drain pipe, not shown. The biasing force of the coil spring 34 is so defined that the regulated pressure should be adequate to provide initial engagement of the clutch 70 or 76. The fluid pressure in the conduit 71 is responsive to the biasing force of the return spring 73 of the forward drive clutch 70 while the piston 72 thereof is moving leftwardly so as to put the forward drive clutch 70 into engagement.

When the piston 72 moves to engage the clutch discs 74 and the fluid conduits 47, 71 and 78 are further pressurized, the pressurized fluid in conduit 78 begins to move the piston 82 of the accumulator 80 rightwardly against the biasing force of the coil spring 86. Therefore, the fluid pressure in the chamber 69 of the forward drive clutch 70 is responsive to the biasing force of the compressed coil spring 86 of the accumulator 80 and gradually further pressurized in accordance with the rightward movement of the piston 82 due to the existence of the orifice 48 while the piston 82 is moving. The accumulator 80 is so designed that the piston 82 should be moved to the position indicated by a dot-and-dash line and fluidically communicate the opening 85 with the opening 21 of the regulator valve assembly 14 upon the fluid in the chamber 69 of the forward drive clutch 70 being sufficiently pressurized to activate the piston 72 to press the clutch discs 74 into substantially perfect engagement, resulting in the pressurized fluid in the chamber 38 actuating the plug 29 to move leftwardly and to press the right end wall of the seat 32 being engaged with the spool valve 22. Therefore, the fluid pressure regulated by the regulator valve assembly 14 is increased in accordance with the diameter of the plug 29, which is so determined that the increased fluid pressure does not give a chance to the forward and rear drive clutches 70 or 76 to sustain the slipping phenomena thereof even at the time that the vehicle is in its maximumly loaded driving condition. While a port 85 is illustrated as being positioned for being communicated with conduit 78 upon movement of the piston 82 to the end of its stroke, it is of course possible to position the port 85 for permitting such fluid communication before the piston 82 reaches the end of its stroke, whereby the control hydraulic pressure of the regulator assembly can be increased in steps during the stroke of the piston 82. Thus, the pressure increasing operation of the accumulator 80 may be changed in two steps.

As will be appreciated from the foregoing explanation, there can be achieved a smooth engagement of the clutch means with less driving power being needed for the oil pump, thereby obviating the power loss thereof in the clutch engaging operation because of the fluid pressure being regulated to be as low as possible during the period when the clutch means does not need a higher pressure.

While the invention has been described with reference to a transmission control system comprising a clutch means for an industrial vehicle, it should be self-explanatory that the present device can be used for various systems, such as the braking system of an automatic transmission.

Various other changes and modifications of the present invention are possible in light of the above teachings. It is to be understood, therefore, that within the scope of the appended claims, the invention may be practiced otherwise than as specifically described herein.

What is claimed as new and desired to be secured by letters patent of the United States is:

1. A hydraulic pressure regulating system for a vehicle, comprising:
   a source of fluid pressure;
   a fluid actuated means;
   a first fluid passage means between said fluid pressure source and said fluid actuated means;
   a regulator valve assembly connected in said first fluid passage means, for regulating the fluid pressure, being discharged from said fluid pressure source through said fluid passage means to said fluid actuated means, to a first value, said regulator valve assembly including first and second pressure responsive piston faces;
   a shift valve unit connected into said first fluid passage means between said regulator valve assembly and said fluid actuated means for activating and deactivating said fluid actuating means;
   a restriction orifice disposed within said first fluid passage means for receiving said regulated pressure and for retarding the increase of fluid pressure in said fluid actuated means;
   a second fluid passage means including first and second portions thereof for connecting said first fluid passage means between said orifice and said fluid actuated means to the second pressure responsive piston face of said regulator valve assembly, thereby to urge said regulator valve assembly in one direction in which the fluid pressure being regulated increases; and an accumulator connected in said second fluid passage means between said first and second portions and comprising a springbiased slidable piston which normally closes said second fluid passage means, said piston always being continuously responsive to and pressurized by the fluid pressure retarded by said orifice via said first portion to thereby gradually increase the retarding fluid pressure in response to slidable movement of said piston, said second portion communicating with said second pressure responsive piston face at one end thereof and normally communicating with drain at the other end thereof and said piston opening communication between said first and second portions of said second fluid passage means when said retarding and gradually increasing fluid pressure exceeds a predetermined value by overriding said second portion and closing communication of said second portion with said drain, the fluid pressure conducted through said second fluid passage means acting on said second pressure responsive piston face and serving to move said regulator valve assembly in said one direction whereby the flluid pressure being regulated by said regulator valve assembly is increased to a second value from said first value.

2. A hydraulic pressure regulating system as set forth in claim 1, wherein said regulator valve assembly comprises:
   a housing;
   a spool valve in one end of said housing for regulating the fluid pressure;
   a seat member being engaged with said spool valve;
   a pressure increasing chamber in the other end of said housing; and
   a plug in said chamber defining said second pressure responsive piston face and including a larger diameter land substantially half of which is axially slidably fitted within a bore of said housing and smaller diameter land.

* * * * *